(12) United States Patent
Kirner et al.

(10) Patent No.: US 9,820,079 B2
(45) Date of Patent: Nov. 14, 2017

(54) CODE-BASED INFORMATION SYSTEM

(71) Applicant: ThePeople.de GmbH, Flein (DE)

(72) Inventors: Markus Kirner, Oberstenfeld (DE);
Carl Michael Nagele, Heilbronn (DE)

(73) Assignee: THEPEOPLE.DE GMBH, Flein (DE)

( * ) Notice: Subject to any disclaimer, the term of this patent is extended or adjusted under 35 U.S.C. 154(b) by 107 days.

(21) Appl. No.: 14/084,992

(22) Filed: Nov. 20, 2013

(65) Prior Publication Data

US 2014/0141756 A1    May 22, 2014

Related U.S. Application Data

(60) Provisional application No. 61/776,382, filed on Mar. 11, 2013.

(30) Foreign Application Priority Data

Nov. 22, 2012  (EP) .................................. 12007898
Dec. 6, 2012  (EP) .................................. 12008162

(51) Int. Cl.
*H04W 4/00* (2009.01)
*G06F 17/30* (2006.01)
*G06K 9/18* (2006.01)

(52) U.S. Cl.
CPC ...... *H04W 4/003* (2013.01); *G06F 17/30047* (2013.01); *G06F 17/30879* (2013.01); *G06F 17/30997* (2013.01); *G06K 9/18* (2013.01)

(58) Field of Classification Search
CPC .................................................. H04W 4/003
See application file for complete search history.

(56) References Cited

U.S. PATENT DOCUMENTS

| | | | |
|---|---|---|---|
| 6,081,827 A | 6/2000 | Reber | |
| 6,519,596 B1 | 2/2003 | Hoyt | |
| 2008/0240595 A1* | 10/2008 | Le Hanne | G06K 19/06009 382/243 |
| 2011/0283196 A1 | 11/2011 | Berger | |
| 2012/0125995 A1 | 5/2012 | Kim | |
| 2012/0223131 A1* | 9/2012 | Lim | G06F 17/30879 235/375 |

(Continued)

FOREIGN PATENT DOCUMENTS

| | | |
|---|---|---|
| JP | 11-090341 A | 4/1999 |
| JP | 2003-271661 A | 9/2003 |

(Continued)

*Primary Examiner* — Mazda Sabouri
(74) *Attorney, Agent, or Firm* — Shlesinger, Arkwright & Garvey LLP

(57) ABSTRACT

A code-based information system for at least one mobile communication unit, wherein individual data are to be associated with a code by means of a specific application to be implemented on the at least one mobile communication unit, the association of the code with the individual data is to be transmitted to a database serving as a central server and is to be deposed there, and the code is to be recognized via said at least one mobile communication unit by means of the application implemented on the at least one mobile communication unit, whereby the association of the code with the individual data is called up from said database and the data are displayed on the mobile communications unit.

11 Claims, 6 Drawing Sheets

(56) References Cited

U.S. PATENT DOCUMENTS

| | | | | |
|---|---|---|---|---|
| 2013/0043302 A1* | 2/2013 | Powlen | ............... | G06Q 50/01 |
| | | | | 235/375 |
| 2013/0048710 A1* | 2/2013 | Marsico | ........... | G06F 17/30879 |
| | | | | 235/375 |
| 2013/0219479 A1* | 8/2013 | DeSoto | ............... | H04W 12/06 |
| | | | | 726/6 |
| 2014/0061297 A1* | 3/2014 | Smith | ............... | H04L 41/0253 |
| | | | | 235/375 |
| 2014/0351589 A1* | 11/2014 | Chenna | ............ | H04L 63/0823 |
| | | | | 713/168 |

FOREIGN PATENT DOCUMENTS

| | | |
|---|---|---|
| JP | 2006-024191 A | 1/2006 |
| JP | 2010 250622 | 11/2010 |
| WO | WO 2007 005969 | 1/2007 |
| WO | WO 2012/158806 | 11/2012 |

* cited by examiner

CODE-BASED INFORMATION SYSTEM

FIELD OF THE INVENTION

The present invention relates to a code-based information system for at least one mobile communication unit. Further, the present invention relates to a corresponding method for providing individual data, for example picture and/or video data, on at least one mobile communication unit.

BACKGROUND OF THE INVENTION

An application, briefly also called app, is an application program for smart phones, tablet computers and other mobile communication units which can quickly and straightforwardly be purchased via an online shop integrated into a corresponding operating system and which can be directly installed and thereby implemented on the respective portable device and the mobile communication unit, respectively.

Mobile communication units, for example mobile telephones provided with a camera, may be upgraded by means of a specific application to a code scanner. Thereby barcodes and matrix codes can readily be read.

Normally, an optoelectronically readable font consisting of different widths, parallel bars and gaps is called barcode.

Meanwhile, nearly each product in commerce is provided with such a barcode, a product-related commercial barcode such as EAN (European article number), UPC (universal product code), IAN or JAN.

Now it is desirable to couple individual information, for example picture and/or video information, to such a barcode or a matrix code, i. e., to encode it therewith, such that the respective information may be decoded and thereby displayed for a user who reads this barcode and this matrix code, respectively, and who moreover is authorised. In order to couple individual information, for example individual picture and/or video information, to a barcode or a matrix code an individual code has to be applied to each individual printed material to which an individual code has to be applied, for example a postcard, in order to ensure that merely the intended receiver of this printed material can access to the information encoded by this code. However, the application of such individual codes to individual printed materials is very complex and, therefore, cost-intensive.

SUMMARY OF THE INVENTION

It is now an object of the present invention to provide a possibility to specifically make accessible individual information, for example picture and/or video information, for one or more selected receivers even by means of printed materials and products with identical codes, i. e. to individually associate information, for example picture and/or video information, with the code provided on the printed material.

For example, since a commercial code of a product is throughout the same code, it is desirable to provide a method to associate in a one-to-one relation information intended only for a special user for the corresponding user.

In order to achieve this object a code-based information system comprising the features of claim 1 as well as a corresponding method comprising the features of claim 10 are provided. Specific and advantageous embodiments can be taken from the corresponding dependent claims.

According to the invention a code-based information system for at least one mobile communication unit is provided. Here, individual information and data, respectively, for example picture and/or video data, are to be associated with a code via a specific application to be implemented on the at least one mobile communication unit. This association and linking, respectively, between the individual data and the code has to be transmitted, for example, via Internet to a database serving as a central server and is to be stored there. The code is to be recognized by the at least one mobile communication unit by means of the specific application, whereby the association of the code to the individual data is called up from the database and the individual data, for example the individual picture and/or video data, are reproduced and displayed, respectively, on the mobile communication unit.

There are different embodiments of the application to be used according to the invention in the form of respective native applications appropriate for a specific platform and a specific operating system, respectively. Native applications generally permit a direct access to some hardware and further functions of a respective mobile communication unit, for example camera, speakers and so on.

Such a native application to be used according to the invention in this manner is for example loaded into a first mobile communication unit and started. Thereby, it is possible to read-in a machine-readable code via a camera function provided in the mobile communications unit and, further, to access to an internal data memory (for example video, photo, sound) of the mobile communication unit and to link data selected therefrom with the code previously detected. This linking is transmitted via Internet to a database serving as a central server and is stored. From now on, when the code is detected via this application of the respective mobile communication unit on which this application is implemented, the deposed information is automatically reproduced.

The application program to be used in the present invention and the specific application, respectively, make it possible to detect two-dimensional codes, so-called data matrixes and barcodes, by means of a camera integrated in the corresponding mobile communication unit, normally a digital camera, and thereby to display for the respective operator and user, respectively, of the mobile communication unit information associated with the respective code and information deposed therein, respectively, in decoded form, i. e. in plain text. Such an information concealed behind a code may be text information, picture information, code-based information, coupon information or even video information. Here, a coupon information may mean that the use of data deposed with the code may also be employed in the case of a bonus and coupon system. If, for example, a recipient regularly reads codes from a plurality of postal deliveries of the specific addressor and thereby views advertising videos related therewith he may be awarded with bonus points on the part of the addressor. Here, a coupon code may be made accessible for the recipient as a coupon by means of which, when presented, he may obtain a rebate from the addressor. This coupon code is associated with the code as individual data, is deposed in the database with this association, such that the recipient, when recognizing this code, may access to this coupon code and/or may view this code by means of his application implemented on his mobile communication unit. Also digital products such as an app, a music piece or a game may be linked with the code as a bonus and an rebate, respectively.

Within the scope of the present disclosure "recognizing the code" means "detecting, reading-in, processing and linking the code with information, and calling up the linking between the code and the information deposed on a central server, respectively".

Normally, the addressor who wants to transmit the individual data, for example picture and/or video data, to a selected recipient, and wants to make them accessible for him, respectively, is provided with a first mobile communication unit, and the selected recipient is provided with a second mobile communication unit. Both on the first and on the second mobile communication unit the specific application has to be implemented. At first, the addressor reads-in the code with the help of the application via the first mobile communication unit and then associates the individual data, for example picture and/or video data, with this code. This association of the code with the individual data is transmitted to a database serving as a central server and is deposed there in an accessible way. The desired recipient now recognizes the code with the help of the application via the second mobile communication unit, whereby the individual data, for example picture and/or video data, are presented to him on the second mobile communication unit. Thus, when recognizing the code at first an access to the database serving as a central server occurs from which the linking between the code and the individual data is called up and thereby the individual data are displayed.

However, it is also conceivable that the addressor associates data, for example picture and/or video data, which are deposed on an other computing unit, for example a PDA, with the code to be read-in via the application implemented on this computing unit, such that the recipient then may recognize the code with the help of the application implemented on the mobile communication unit associated with the recipient, and thereby may view the data, for example picture and/or video data.

Generally, it is conceivable that a plurality of recipients to be specified by the addressor may access to the data.

By means of the specific application provided according to the invention which, for example, has to be implemented and installed, respectively, on the corresponding mobile communication unit of the addressor, individual picture and/or video information captured with a camera provided in the respective mobile communication unit may be deposed by means of a barcode and/or a matrix code to be read-in and thereby may be stored in the above-mentioned database serving as a central server, and eventually on the mobile communications unit.

With the help of the specific application to be used according to the invention, also called interaction code app, or briefly IAC app, an arbitrary barcode or QR code (Quick Response Code) which is presented on optically readable media is associated with specific information, for example pictures, videos and so on. These are then stored in a server which, for example, may be reached via the Internet and may be called up via the IAC app through an integrated scanner from arbitrary mobile communication units and mobile terminals, respectively. Thereby, on the part of an addressor contents accessible for the public may be deposed in the system which then can be called up by all users of the IAC app by means of the scanner integrated in their respective mobile terminal and in the respective associated mobile communication unit, respectively. Further, according to the invention the addressor may depose individual information not accessible for the public for each code via the IAC app. This information may be made accessible by the operator beforehand for a defined set of recipients, for example per mobile phone number or via other identification systems, for example social networks or email addresses. Alternatively, the content may also be protected by an access code and a password, respectively, which the recipient must input in order to reproduce the information linked with the code.

Then the recipient is identified beforehand with his individual unique mobile phone number, his terminal identification number or with other systems, for example email or social networks, before the individual data are displayed, and thus generate unique user and recipient identification, respectively. The detection of the identification information may be performed, for example, by an input mask in the IAC app or by an automated reading-out from the mobile communication unit of the recipient. The mobile phone number can be predetermined on the part of the addressor via manual selection in a corresponding address book of the addressor.

Further users are able to read the deposed information, depending on the authentication modality selected by the addressor, only if they input the access code and the password, respectively, transmitted beforehand, or if they identify themselves as defined recipients, for example via their mobile phone number. This identification is done via the above-mentioned method. If a plurality of information items are deposed corresponding to the same barcode or QR code, the code-based information system according to the invention may discriminate between contents accessible for the public and contents protected by the addressor.

Via the application the addressor connects picture and/or video information deposed and stored, respectively, on a mobile communication unit associated with him to a read-in code such that this picture and/or video information is then stored in a database serving as a central server in association with this code. The recipient scans the code by means of the specific application implemented in the mobile communication unit associated with him, whereby the picture and/or video information associated with this code is called up from the database serving as a central server and is reproduced on the mobile communication unit associated with the recipient.

The inventive system can use barcodes, also EAN codes, on packages, matrix codes and franking prints of postal deliveries, for example postcards.

According to one embodiment of the code-based information system according to the invention an access to individual data encoded with the code has to be granted for the application after the presentation of a password. Thereby, it is conceivable that the password has to be assigned by an addressor of the data, for example picture and/or video data, and has to be communicated to a user of the mobile communication unit. Such a password, for example, may be transmitted on a postcard provided with the code as a fictive word and as a corresponding character string, respectively, noted by the addressor separately from the code. This means, that on the respective printed matter, for example a postcard, both the code with which, for example, the postcard is already available in commerce, and the character string individually printed and applied, respectively, by the addressor are provided. Such an approach is advantageous in that printed matters available in commerce, for example postcards, may all be provided with the same code which is individualized first by the addressor via the corresponding application, wherein the addressor deposes further information, that is, individual data, for example picture and/or video data which are then made accessible for a selected recipient by means of an appropriate mobile communication unit not until the transmitted password is input. The addressor uses the application which has to be implemented on his mobile communication unit in order to read-in the code deposed on the postcard and to subsequently depose selected data, for example picture and/or video data, and to protect them with a password. The recipient may read-in the code provided on the printed matter via the same application which has to be implemented beforehand on his mobile communication unit, wherein he is then asked for the password, and the individual data, for example picture and/or video and data, are displayed on his mobile communication unit not until the password is input. Thereby, only an authorised access to the individual data, for example picture and/or video data, is possible such that not everyone may call up these individual data, for example picture and/or video data. With such an approach it is avoided that each printed matter must already be individualized when purchased in commerce, rather it is sufficient if a code is provided which may be individualized by the addressor via the application, which means that further data, for example picture and/or video data, may be deposed which are also accessible only for a special recipient selected by the addressor.

Besides the possibility to realize the authorisation for the access to the individual data, for example picture and/or video data, via a password, it is also conceivable that current position data of the mobile communication unit of the selected recipient are detected and thereby the code is automatically recognized via the application on the mobile communication unit.

Further, it is conceivable according to another embodiment of the code-based information system that the mobile communication unit is a mobile phone. Hereby, it is further possible that the addressor of the individual data, for example picture and/or video data, uses a mobile phone number associated in a one-to-one relation with the mobile phone in order to authorise the access to the data, for example picture and/or video data, which means that the user of the mobile phone when reading-in the code via the application implemented on the mobile phone automatically can access to the individual data, for example picture and/or video data, "concealed" behind the code based on the specifically selected mobile phone number, which means that the information is automatically displayed on his mobile phone.

According to another embodiment of the information system according to the invention it is further also possible that biunique franking prints on a postal delivery awarded on the part of the post serve simultaneously as the code of the information system, because also with this a biunique association with the recipient selected as being authorised on the part of the addressor is given. However, in this case it is necessary that first after application of a respective franking print on a respective postal delivery on the part of the addressor the individual data, for example picture and/or video data, are deposed to which the recipient then has automatic access via the application implemented on his mobile communication unit. For the postal delivery a postcard, but also other postal pieces such as letters and packets, may be used. When printing the franking print by means of a corresponding franking machine it is also possible within the scope of the invention to apply, instead of the actual franking print, an adjacent system code in the same printing operation on the respective postal delivery which has then to be used for deposing individual data on the part of the addressor.

Further, the present invention relates to a method for deposing and transmitting individual data, for example picture and/or video data, wherein individual data, for example picture and/or video data, are associated with a code via an application to be implemented on at least one mobile communication unit, the association of the code with the individual data is transmitted automatically to the database serving as a central server and is deposed there, and the code is recognized by the mobile communication unit by means of the application, whereby the association of the code with the data is automatically called up from the database and the data, for example picture and/or video data, is automatically displayed and reproduced, respectively, on the mobile communication unit.

As already mentioned above, it is possible to grant an access to the deposed individual data, for example picture and/or video data, only if a password awarded by the addressor is correctly input on the part of the recipient so that the individually deposed data, for example picture and/or video data, are then released and thereby displayed for the recipient. When the addressor awards a password, then a password is generated for him by the application, or the addressor himself inputs a password selected by him. The password on the part of the addressor may, for example, be applied onto a printed material to be transmitted to the desired recipient or onto a product to be transmitted to the desired recipient. The desired recipient detects the code by means of his mobile communication unit and then inputs the password transmitted to him by the addressor when prompted by the application. Only then the coded information is released and displayed for the recipient on the mobile communication unit, for example on a corresponding display. In the case of video data, it is also conceivable that the video is displayed and the sound is correspondingly made acoustically perceptible through a speaker provided in the mobile communication unit. An association with the desired recipient can also be done, as already mentioned above, in the case that the mobile communication unit is a mobile phone, via a mobile phone number associated with the mobile phone in a one-to-one relation. Here, the addressor indicates the mobile phone number of the recipient and of the mobile phone associated with the recipient, respectively, in the application and the recipient identifies himself for use by means of his mobile phone number. The mobile phone number may be directly selected by the addressor among the mobile phone numbers stored in the mobile phone.

As mentioned above, moreover also the location and the current position data of the recipient, respectively, may serve for association. Here, the addressor may input a destination address of the recipient. The application in the mobile communication unit grants an access to a GPS location of the mobile communication unit of the desired recipient.

For postal deliveries an individual franking print serves for the deposition of specific individual picture and/or video information of the addressor. The recipient may read-in the franking print via the application on his mobile communication unit and thereby may directly call up the individual picture and/or video information deposed there such that they are reproduced in an appropriate way on his mobile communication unit. Because of the uniqueness of the individual franking prints due to digital printing technology, individual data, for example picture and/or video information, may associated with each franking print. The franking prints are applied by means of digital printing technology on respective postal deliveries with all relevant data encrypted in a Data Matrix Code (2-D barcode) or barcode or are attached by means of a self-adhesive franking strip. Such franking prints are read by many international postal service providers, for example the Deutsche Post AG, for the purpose of payment saving as well as sequence control and sequence saving. Each print is a unique copy due to individual security information. This enables the above-mentioned association with a respective recipient in a one-to-one relation.

Further advantages and embodiments of the invention result from the description and the attached drawings.

It is to be understood that the above-mentioned features as well as the features which are to be illustrated in the following are not only usable in the respective given combination, but also in other combinations or uniquely without departing from the scope of the present invention.

The invention is schematically illustrated in the drawings based on an embodiment and is descripted in detail in the following in conjunction with the drawing.

DETAILED DESCRIPTION OF THE DRAWINGS

Figure 1A:
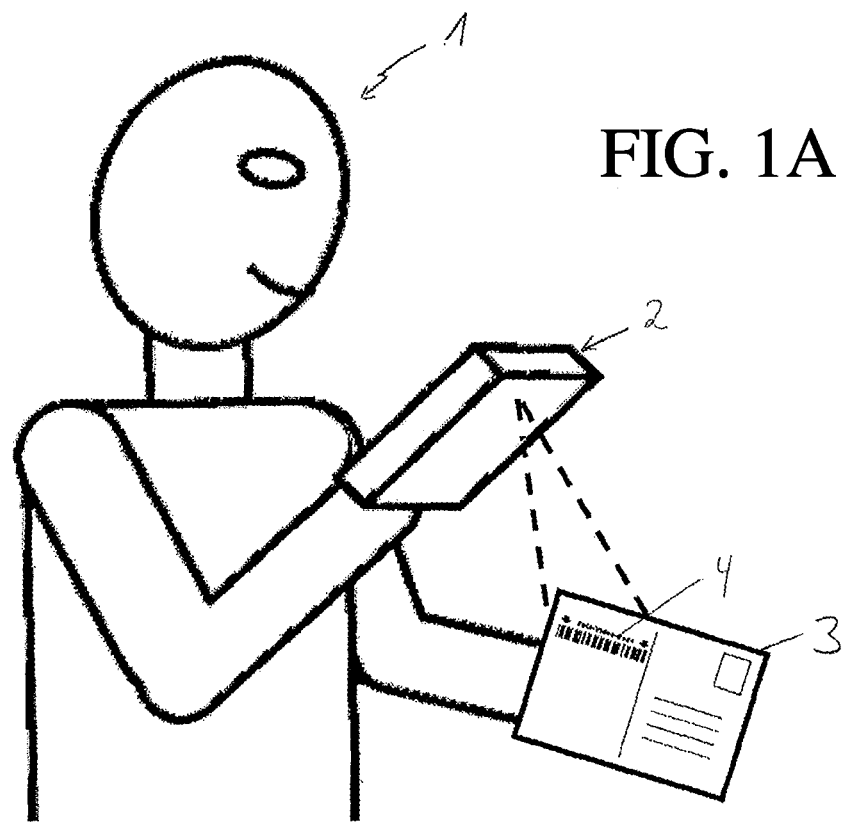
FIGS. 1A and 1B show in a schematic representation partial aspects of the first embodiment of the method according to the invention.
Figure 1B:
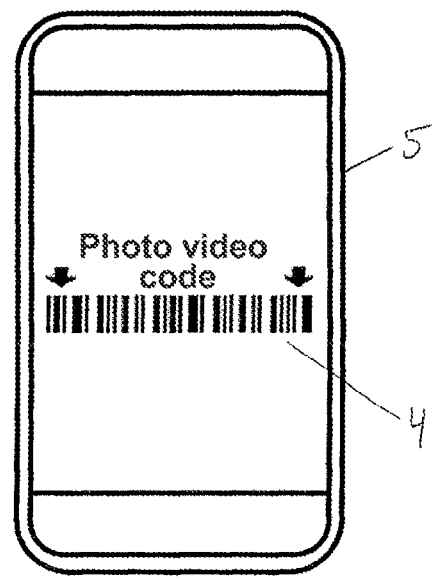

FIGS. 1A and 1B show a user 1 with a mobile communication unit 2 comprising a camera, not shown in further detail here. With the help of the camera which may, for example, be integrated in the mobile communication unit 2 or is at least communicatively connected thereto, it is also possible to capture a code in addition to capturing pictures. Such a code 4 is, for example, provided on a printed material 3 such as a postcard here. With the help of the camera it is now possible as shown by the dash lines to capture the code 4 provided on the postcard 3. This code 4 appears on the display 5 of the mobile communication unit 2 and is then recognized.

Figure 2A:
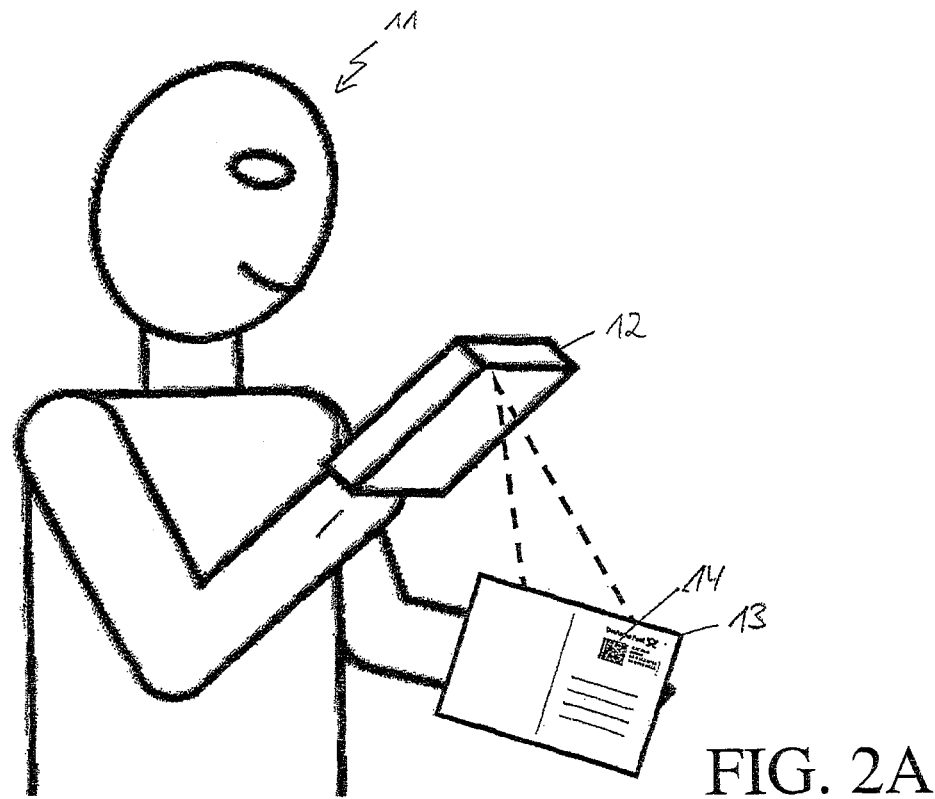
FIGS. 2A and 2B show in a schematic representation partial aspects of a further embodiment of the method according to the invention.
Figure 2B:
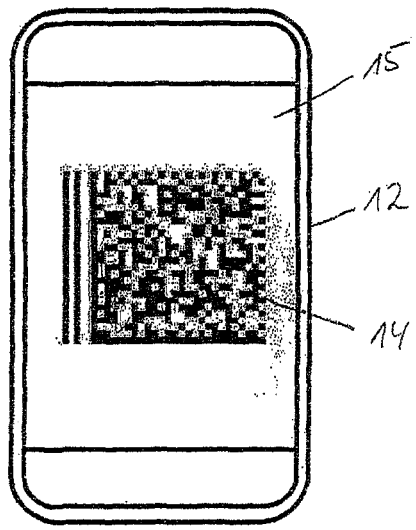

FIGS. 2A and 2B again show a user 11 with a mobile communication unit 12. The mobile communication unit 12 comprises just as the mobile communication unit 2 from FIG. 1 a camera which is not shown in further detail here and which may be integrated in the mobile communication unit 12 or which is at least communicatively connected thereto. With the help of the camera it is possible to capture, to read-in and to display on a respective display 15 of the communication unit 12 both pictures and other information which are provided, for example, on printed material. In FIG. 2, in contrast to FIG. 1, a franking print 14 provided on a postcard 13 is captured with the help of a camera not shown in greater detail here, as indicated in dash lines. This franking print 14 then appears on the display 15 of the mobile communication unit 12. For example, the mobile communication unit 12 may be a mobile phone.

Now, if the operator 1 or 11 is provided with an embodiment of the specific application provided according to the invention which is implemented on his mobile communication unit 2 and 12, respectively, he is able with the help of this application to connect data, for example picture and/or video data, selected by himself and deposed in a memory unit of the mobile communications unit 2 and 12, respectively, to the code 4 now read-in and the read-in franking print 14, respectively, and thereby to depose these data, for example picture and/or video data, encoded by means of the code 4 and 14, respectively. This association and linking, respectively, of the individual data with the code 4 and the franking print 14, respectively, is centrally deposed on the database serving as a central server so that it may be called up. Further, he is able by means of the application to select persons who shall have access to the deposed data, for example picture and/or video data, and he may provide that these persons have to authenticate themselves in a manner appropriate for the access. To this end, there are different possibilities how to realize such an authentication which is described in more detail in the following figures.

Generally, it is conceivable that, for example, the franking print 14 which may be associated with the recipient in a one-to-one relation is valid as an authentication of the recipient so that after authentication by the franking print located on the postcard he is able to call up from the database information deposed with an other code provided on the postcard, for example the code 4, and connected to this code, respectively. Further, it is conceivable that any supporting medium, for example also a poster or a digital screen, can be selected as the supporting medium for the code which has to be associated with individual information and individual data, respectively, on the part of the addressor. It is only important that the recipient performs an authentication selected by the addressor in order to call up individual data connected to the code before he is able to call up the individual data associated with the code.

Figure 3A:
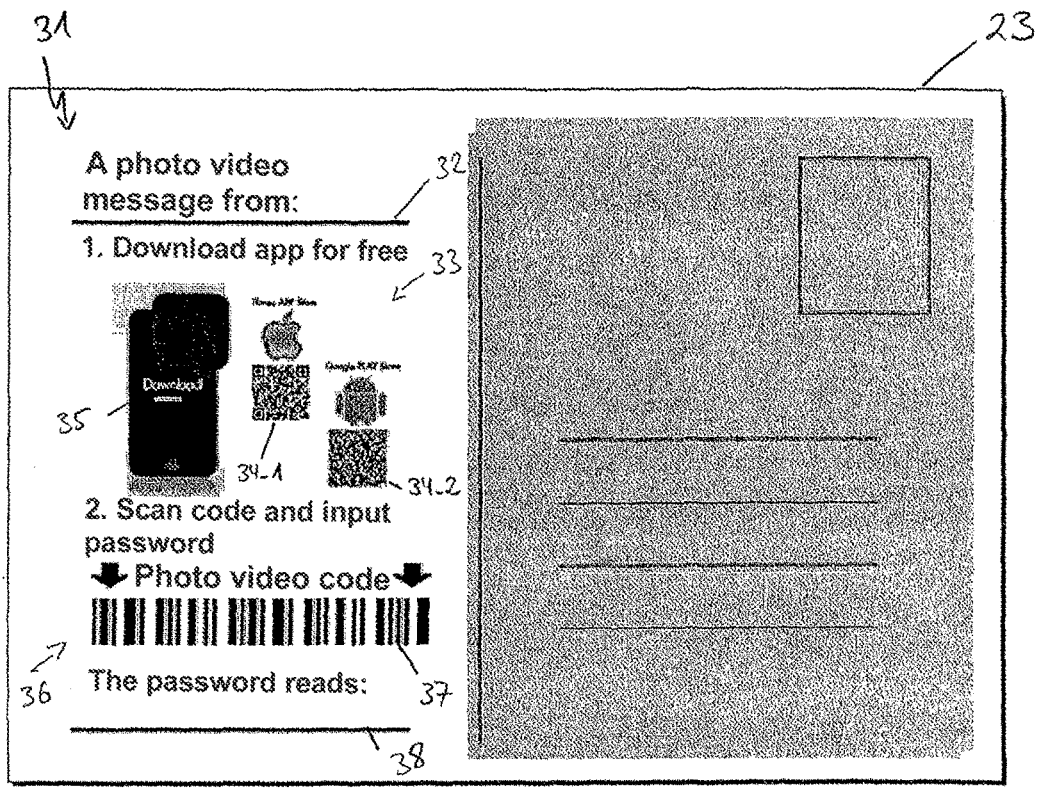
FIGS. 3A-3C show a printed material to be used in performing another embodiment of the method according to the invention.
Figure 3B:

FIG. 3A shows a print material, here a postcard 23. On the postcard 23 a plurality of forms are provided in the field 31 which normally serves for printing and hand-writing, respectively, information which enable the recipient of the postcard 23 by means of the postcard 23 to call up and to recognize data, for example picture and/or video data, deposed for him. To this end, it is provided in the information field 31 in the first upper portion, that the addressor identifies himself on a line 32 with his name. In a central region 33 it is explained under item 1 "Download app", how the recipient downloads with the help of the mobile communication unit belonging to him an embodiment of an application according to the invention necessary for reading-out data, for example picture and/or video data. Depending on the operating system implemented on the mobile communication unit of the recipient the recipient has to download a corresponding app 34_1 and 34_2, respectively, with the help of a camera integrated in his mobile communication unit, as indicated in the pictorial representation 35 of a mobile communication unit. Besides the two app embodiments exemplified here it is conceivable that many further operating systems should be taken into account correspondingly. Then the desired application is downloaded and implemented on his communication unit. Then he alone is able to read-in the code 37, also shown in FIG. 3B, with the help of the camera integrated in the mobile communications unit as indicated in the region 36 under item 2 "Scan code and input password". After reading-in the code 37 the application which is now implemented on the mobile communication unit prompts the recipient to input a password which authorises the recipient to read-out the data associated with the code 37, for example picture and/or video data, which the addressor has deposed there. The password is now indicated on the part of the addressor under the title "The password reads:" on line 38 so that the recipient after reading this password simply has to input this password in his mobile communication unit, wherein the read-in code 37 is decoded in so far as the individual data connected to it, for example picture and/or video data, are automatically displayed on a display of the mobile communication unit and reproduced, respectively.

Figure 3C:
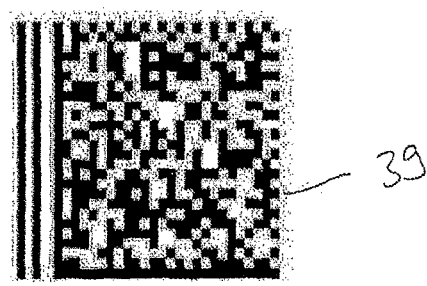

Instead of providing a code which by deposing a password enables an individual access to data, for example picture and/or video data, associated with the code by the addressor, it is also conceivable that the addressor encodes the data selected by him, for example picture and/or video data, with a franking print 39 to be provided on the postcard 23, as shown in FIG. 3C. Since each individual postcard is provided with a unique franking print when delivered to a recipient, also here again a one-to-one association of an access to the data, for example picture and/or video data, for the corresponding recipient is possible. The recipient now only has to read-in the franking print, wherein also here of course an embodiment of an application necessary according to the invention has to be implemented on his mobile communication unit. However, only reading-in the franking print is sufficient, even without inputting a password, for presenting the data, for example picture and/or video data, connected to the franking print on a display of the mobile communication unit of the recipient and for reproducing them, respectively.

Figure 4:
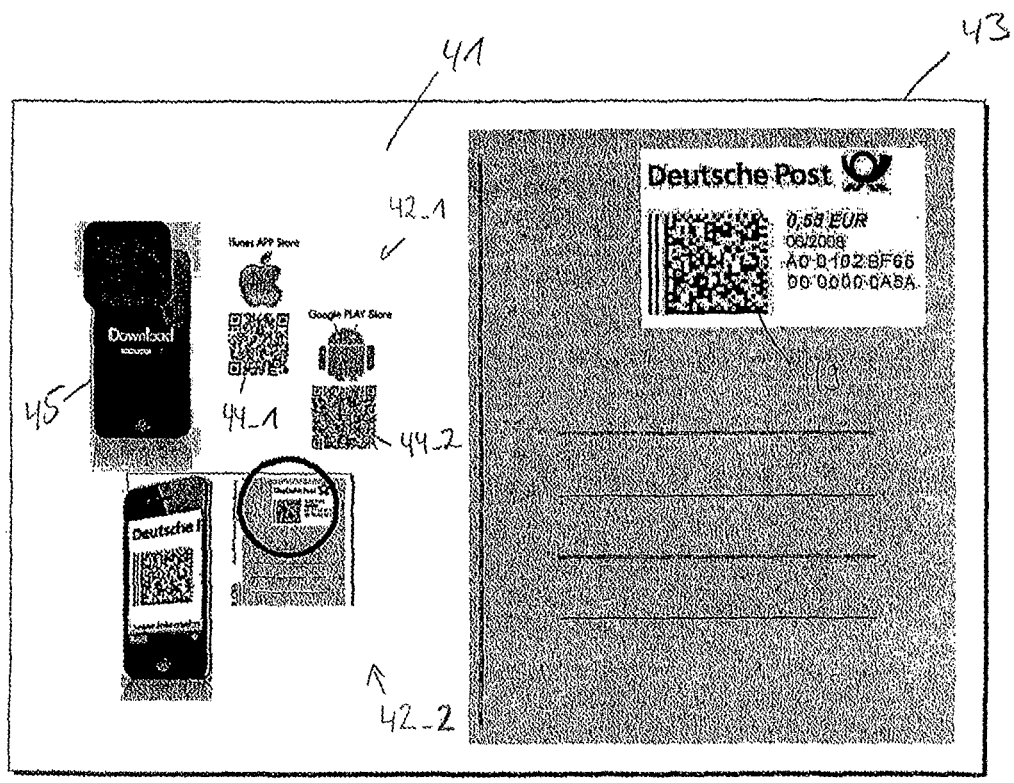
FIG. 4 shows a further example of printed material to be used in realizing an other embodiment of the method according to the invention.

FIG. 4 shows a postcard 43 which permits to couple desired data on the part of the addressor, for example picture and/or radio data, to a franking print, so that the recipient is automatically authorised by reading-in the franking print 49 to view the data, for example picture and/or video data, which means that they are automatically displayed on a display of his communication unit. However, to this end, it is necessary that the recipient captures an embodiment of the application necessary according to the invention, depending on the operating system either the application 44_1 or 44_2, with his mobile communication unit and a camera integrated in the mobile communication unit, respectively, and downloads this application and then implements this application in the mobile communication unit. Only with the help of this application the data, for example picture and/or video data, are automatically displayed and reproduced, respectively, during reading-in the franking print 49. Here, the region 41 provided normally for the deposition of information shows two regions, i. e. an upper region 42_1 and a lower region 42_2. In the upper region 42_1 it is indicated for the recipient that and how he has to download the necessary application in his mobile communication unit. Besides the schematic representation 45 of a mobile communication unit, depending on the operating system provided in the mobile communications unit, the application 44_1 or 44_2 is printed for capturing. In the lower region 42_2 it is indicated how he has to proceed now, after the download of the application, in order to view the deposed data, for example picture and/or video data. That is, he has to read-in the franking print 49 located on the postcard by means of his mobile communication unit which is shown here schematically, which enables via the application downloaded beforehand to view the data associated with the franking print 49, for example picture and/or video data.

Figure 5A:
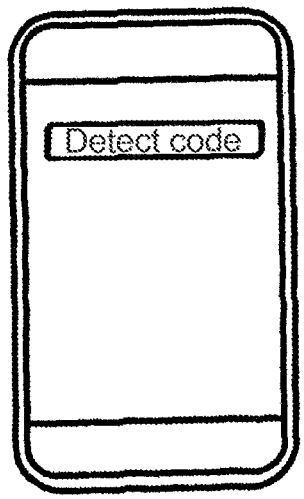
FIGS. 5A-5C show the process of the association of a code with individual data according to a further embodiment of the method according to the invention.
Figure 5B:
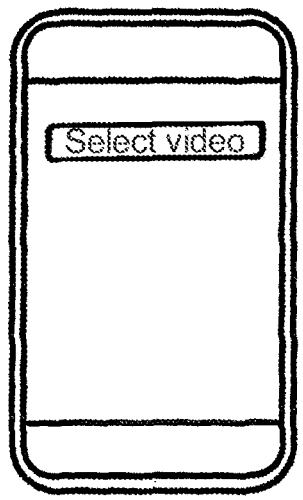
Figure 5C:
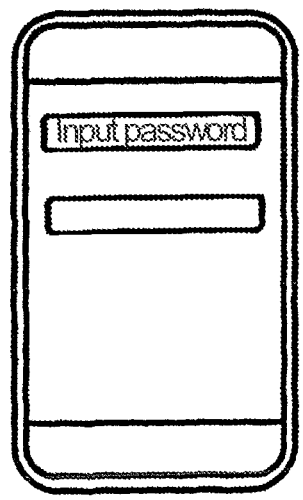

FIGS. 5A-5C describe in the schematic representation how an addressor has to proceed if he wishes to associate data, for example picture and/or video data, with a code and to individually depose them subsequently for a specific recipient.

At first, as shown in FIG. 5A, he has to read-in the code provided, for example, on printed material. This is normally performed with a camera integrated in a mobile communication unit associated with him or at least communicatively connected to the mobile communication unit. When the code has been detected by means of an embodiment of the specific application implemented in his mobile communication unit the operator and the addressor, respectively, has to select data, as shown in FIG. 5B, for example a desired video or other picture data, so that they can be connected to the read-in code and associated with this code, respectively. In order to individually depose the data, for example picture and/or video data, it is further possible, as shown in FIG. 5C, to select and input a password so that the data, for example picture and/or video data, are displayed merely by inputting a password after reading-in the code. Thereby, the access to the data, for example picture and/or video data, is individualized. Thereby, it is also possible to use a code normally accessible for the public, for example, a code which is provided on nearly every product or on an arbitrary postcard.

Figure 6A:
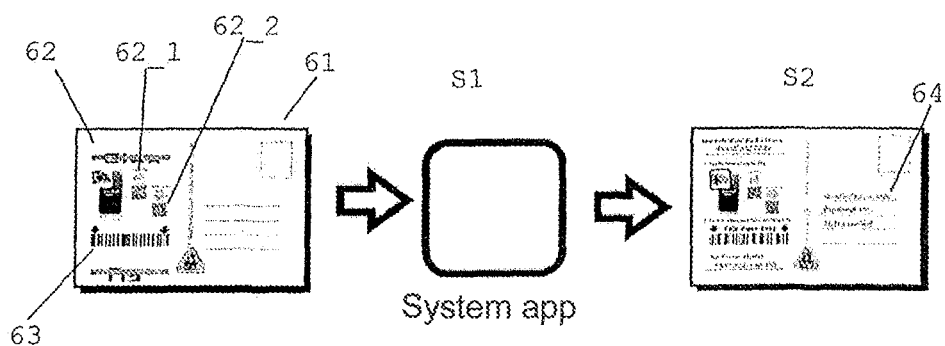
FIGS. 6A-6B show in a schematic representation of a step-by-step process of an approach for the deposition of individual data, for example picture and/or video data, for realizing a still further embodiment of the method according to the invention on the part of the addressor.
Figure 6B:
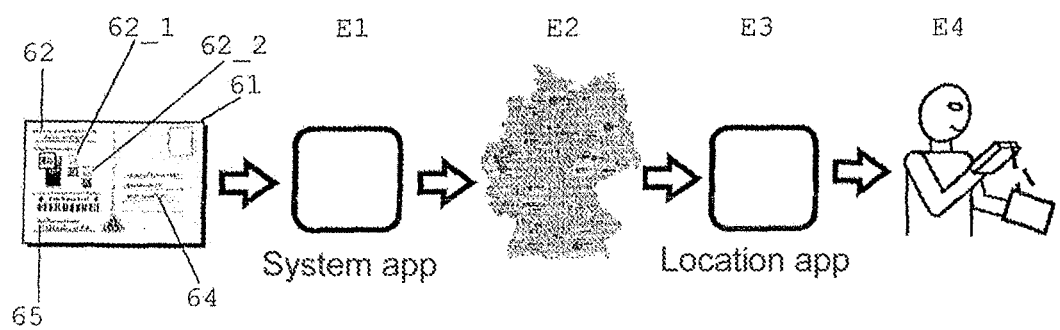

FIGS. 6A-6B describe in a schematic representation another embodiment of the method according to the invention. FIG. 6A shows step by step how an addressor has to proceed in order to transmit individual data, for example individual text, picture and/or video data, to one or more recipients selected by him and to make them accessible, respectively. Here, the addressor is provided with a postcard 61 which is available in commerce and/or by public display. The postcard 61 shows in one region 62 a system application (system app) to be downloaded which is 62_1 or 62_2 depending on the operating system provided in the communication unit necessary for the download. Further, a code 63 is represented in the region 62. In order to depose individual data with the help of the code 63 the addressor at first downloads with a mobile communication unit associated with him the system app with the help of the represented apps 62_1 or 62_2 and then reads-in the code 63. In a step S1 he then connects the desired individual data to the code 63. Thereafter, the system app generates a password, or alternatively the addressor himself inputs a password and notes it, normally by hand-writing, on the postcard 61. The postcard 61 is then delivered in a step S2 to a desired recipient as noted in the region 64, or is directly forwarded to him.

Now, in FIG. 6B it is shown, how a recipient of this postcard 61 sent from the addressor has to proceed in order to be able to finally view the data deposed behind the code 63. The recipient receives the postcard 61 with the password 65 provided thereon. The recipient also downloads the system app 62_1 or 62_2 with the help of the mobile communication unit associated with him. Then, in step E1 this system application is started. After starting the system application the recipient is automatically located by means of a locating function, normally a GPS function, of his mobile communication unit, in step E2. After the location a locally adjacent application is offered to the recipient by the system application in step E3 with the help of which the recipient is finally able to view the individual data linked with the code 63. Alternatively, the recipient may select the desired app from a list displayed by the system app in step E4. After downloading the app proposed or selected from a list, as schematically shown, he starts it on his mobile communication unit. With the help of a camera integrated in the mobile communication unit or at least communicating with the communication unit the recipient reads-in the code 63 on the postcard 61 and is then asked for a password on the part of the application which he inputs based on the password 65 noted on the postcard 61, and then the individual data, for example video data, deposed by the addressor are automatically displayed on the display of the mobile communication unit, and eventually are made acoustically perceptible by a corresponding speaker unit of the mobile communication unit.

In the embodiment of the method according to the invention shown in FIG. 6 two applications are to be used in order that the recipient is finally able to view the individual data deposed with the help of a code 63. Here, a first application, referred to as system application here, is provided to be able to link the individual data with the code 63 and eventually to generate a password. Further, after the location of the mobile communication unit associated with the recipient, the system application on the part of the recipient serves to indicate for the recipient that he can recognize the individual data deposed by the addressor after reading-in the code by means of an app to be downloaded in the local proximity of the recipient and proposed by the system app.

Alternatively, it is possible that the recipient scans a QR code provided on a postcard in which an URL is coded, by means of a common smartphone app or a scanner connected to the communication unit associated with the recipient, and then calls a website and a homepage, respectively, linked with the URL. Here, the recipient is now automatically forwarded and linked, respectively, to an app store as, for example, provided by Google, Apple and so on, supporting an operating system of a communication unit connected to the recipient. If it is not possible to automatically recognize the corresponding operating system, a selection is performed by the recipient in a list provided on the homepage. The homepage also recognizes a location of the recipient by interpreting geo data which the recipient provides when arriving on the website and on the homepage, respectively. With the help of this function the recipient is now offered a locally adjacent app for downloading, or the recipient may select from a list and download an appropriate local app.

The invention claimed is:

1. A code-based information system, comprising:
an addressor mobile communication unit and at least one recipient mobile communication unit, said addressor mobile communication unit including individual content data;
a database serving as a central server;
an application which is implemented on said addressor mobile communication unit and said at least one recipient mobile communication unit;
an arbitrary code;
wherein an association of said individual content data with said arbitrary code is made by means of said application that is implemented on said addressor mobile communication unit;
wherein said arbitrary code is detected by means of a camera integrated in said addressor mobile communication unit before any association of individual content data with said arbitrary code is made; and
wherein said association, comprising said individual content data and said arbitrary code, is to be transmitted from said addressor mobile communication unit to said database serving as said central server and stored in said database for later access, wherein said arbitrary code is to be recognized via said at least one recipient mobile communication unit by means of said application implemented on said at least one recipient mobile communication unit, wherein said association of said arbitrary code with said individual content data is to be called up from said database for download and display on said at least one recipient mobile communication unit.

2. The code-based information system according to claim 1, wherein said arbitrary code is to be recognized by means of said application after a password has been input in said at least one recipient mobile communication unit.

3. The code-based information system according to claim 2, wherein said at least one recipient mobile communication unit may read-in said arbitrary code after inputting said password via said at least one recipient mobile communication unit by means of said application implemented thereon, whereby said individual content data may be displayed on said at least one recipient mobile communication unit.

4. The code-based information system according to claim 1, wherein said addressor mobile communication unit and said at least one recipient mobile communication unit are a mobile phone.

5. The code-based information system according to claim 4, wherein a mobile phone number associated with said at least one recipient mobile communication unit is to be indicated by said addressor mobile communication unit when associating said individual content data with said arbitrary code, whereby said arbitrary code is automatically recognized by means of said application implemented on said at least one recipient mobile communication unit mobile phone.

6. The code-based information system according to claim 1, wherein actual positional data of said at least one recipient mobile communication unit are to be indicated by said addressor mobile communication unit when associating said individual content data with said arbitrary code, and are then to be detected on said at least one recipient mobile communication unit, whereby said arbitrary code is automatically recognized via said application implemented on said at least one recipient mobile communication unit.

7. The code-based information system according to claim 1, wherein a franking print of a postal delivery simultaneously serves as said arbitrary code.

8. A method for code-based provision of individual content data on at least one recipient mobile communication unit, comprising:
an application on an addressor mobile communication unit is implemented;
an arbitrary code is detected by means of a camera integrated on said addressor mobile communication unit,
individual content data in said addressor mobile communication unit are associated to said arbitrary code previously detected to provide an association of said arbitrary code with said individual content data by means of said application implemented on said addressor mobile communication unit, wherein said arbitrary code is any existing code detectable by means of said camera integrated in said addressor mobile communication unit before any association of individual content data with said arbitrary code is made; and
said association, comprising said individual content data and said arbitrary code, is transmitted from said addressor mobile communication unit to a database serving as a central server and said association, comprising said individual content data and said arbitrary code, is stored in said database for later access for download from said database and display on said at least one recipient mobile communication unit.

9. The method according to claim 8, which is performed by a code-based information system according to claim 1.

10. The code-based information system according to claim 1, wherein said arbitrary code is disposed on a printed material.

11. The code-based information system according to claim 10, wherein:
   said printed material includes a postcard with a barcode or matrix code; and
   said arbitrary code includes said barcode or matrix code.

* * * * *